July 9, 1940. L. BLACKMORE ET AL 2,207,371
FLUID SEALING DEVICE
Filed March 2, 1938
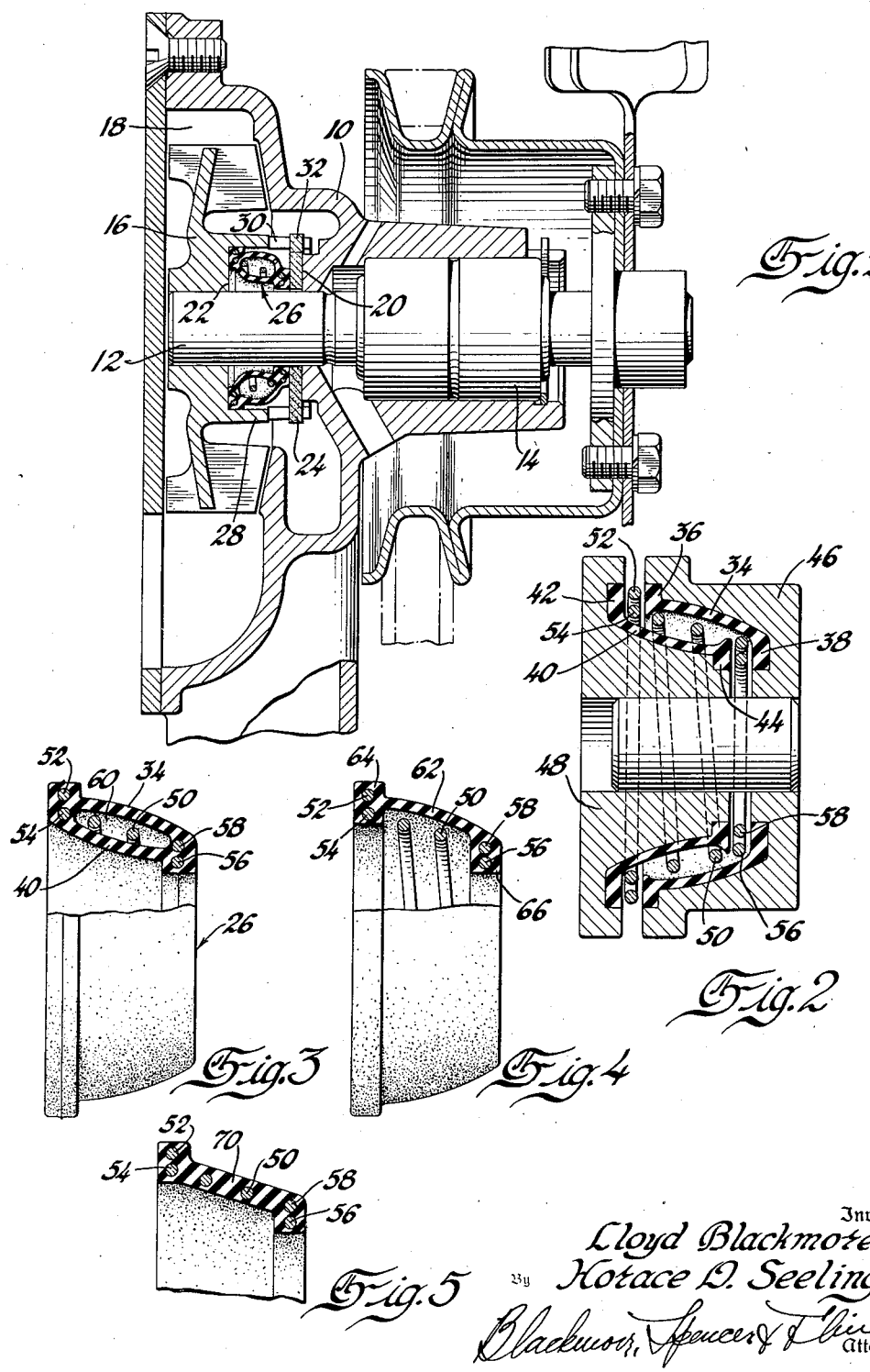
Inventors
Lloyd Blackmore &
Horace D. Seelinger
By Blackmore, Spencer & Flint
Attorneys Patented July 9, 1940

2,207,371

UNITED STATES PATENT OFFICE 2,207,371

FLUID SEALING DEVICE

Lloyd Blackmore, Detroit, and Horace D. Seelinger, Highland Park, Mich., assignors to General Motors Corporation, Detroit, Mich., a corporation of Delaware Application March 2, 1938, Serial No. 193,418

4 Claims. (Cl. 288—2)

This invention relates to fluid sealing devices such as are used in pumps or similar apparatus wherein a shaft which rotates within a housing projects outwardly through an opening formed in the latter, and it is desired to prevent leakage through the clearance which necessarily exists between the shaft and the edge of the opening in the housing.

A form of sealing device which has gone into extensive use recently is comprised of a member formed of rubber or some suitable resilient composition material which is adapted to be compressed between opposed faces provided on both the shaft and the housing, and a compression spring is sometimes employed in conjunction with the member to expand the latter toward the faces. Since there necessarily is relative rotary movement between the rubber or composition member and one of the faces, a disc of any suitable anti-friction material is interposed between the member and the face which has rotary movement relative to it, in order to prevent wear of the member. Sealing devices of this type, while generally satisfactory for the purpose intended, are subject to several objections. First, since they are composed of several parts such as the member formed of rubber or composition material, a compression spring and two or more spring retaining rings, the cost of such a sealing device is relatively high because of the number of parts involved. Second, in order to insure that these parts are retained in proper relation to each other while being handled and during use, they must be assembled together as a unit, and some means must be provided to secure them together in such position, and this assembly operation further increases the cost because of the labor involved. Third, since the compression spring and the retaining rings employed in connection with it are exposed to the fluid being circulated by the pump or similar device, and since this fluid often contains chemicals or substances which corrode or otherwise injure the spring or retaining rings, the result is that after a relatively short period of use their normal operation is interfered with, and their life is shortened.

It is therefore an object of this invention to provide a fluid sealing device of the general type referred to, which will not be subject to the objections pointed out. This is accomplished by molding portions of the compression spring or equivalent member in the rubber or composition material either at the time the latter is formed to the desired shape or during the assembly operation. This not only insures that the spring will be assembled and will be held at all times in proper relation to the member, but also avoids the necessity of providing any spring retaining rings, and therefore reduces the cost of the sealing device greatly because of the reduction in the number of parts necessary and the saving in labor because of the simplification of the assembly operation. Furthermore, in a preferred form of the invention, the compression spring is completely encased within the rubber or resilient composition member so that the fluid being circulated by the pump cannot come into contact with it, and it therefore does not become corroded or affected in any way by such fluid, with the result that it always functions properly and its life is greatly increased.

If desired, the rubber or composition member may be so formed during the manufacturing operation and so handled during the assembly operation that only the end portions of the spring will become embedded within the material of which the member is formed, the intermediate or central portion of the spring while still being completely encased within and protected by the member, not being embedded within the material of which the member is formed, and thereby being free to expand or to be compressed without any interference because of the material of which the member is formed coming into contact with this portion of the spring.

Other objects and advantages of the invention will be apparent upon reference to the specification and accompanying drawing, in which Fig. 1 is a transverse sectional view through a pump, showing our improved fluid sealing device associated therewith.

Fig. 2 is a sectional view, on a somewhat larger scale, illustrating the method employed in manufacturing our improved sealing device.

Fig. 3 is a sectional view showing the completed sealing device.

Fig. 4 is a view similar to Fig. 3 but showing a modified form of sealing device.

Fig. 5 is likewise a view similar to Fig. 3, but showing another modified form of sealing device.

In the drawing the invention has been shown as applied to a water pump of the type used on automobile engines, but it will be understood that it may be used equally as well in other types of fluid circulating pumps or the like.

The numeral 10 indicates the housing of the pump, and 12 is a shaft which is journalled in a bearing 14 supported in the housing. An impeller 16 secured on the shaft rotates in pump chamber 18 to cause the circulation of the fluid being pumped. A face 20 is formed on the housing and a face 22 is provided in the impeller, and it is between these two faces that our improved sealing device operates to prevent the leakage of fluid from the pump.

Since there necessarily is relative rotary movement between the sealing member and one of the faces, a disc 24 formed of any suitable anti-friction material is located in such position that it will bear against the face 20 on the housing.

The sealing member, which is here referred to as a whole by the numeral 26 and the construction and method of manufacture of which will be described in detail later, is disposed in the space between the face 22 and the disc 24, being compressed between the two parts so that a fluid tight seal will be effected at these points of contact. Since in the structure illustrated, the sealing member 26 is intended to rotate with the shaft and the impeller, it is essential that the anti-friction disc 24 rotate with the sealing member at all times in order to prevent wear of the sealing member. Therefore, in order to insure that the disc 24 rotates with the sealing member, an annular extension 28 is formed on the impeller, and a plurality of slots 30 are formed in this extension. Projections 32 formed on the disc 24 fit into these slots, which results of course in the disc being positively driven by the impeller, so that there is no possibility of there being any relative rotary movement between the sealing member 26 and the disc 24, but the latter is of course free to move axially with respect to the impeller.

The construction of a preferred form of the sealing member 26 can best be explained by describing the method by which it is manufactured. Referring to Fig. 2, the numeral 34 indicates an annular shell formed of rubber or any of the well-known synthetic resilient compositions which are adapted to withstand the action of heat and chemicals to which they are exposed during usage. This shell is somewhat larger in diameter at one end than at the other, and an outwardly extending flange 36 is formed at the large end and an inwardly extending flange 38 at the small end. 40 indicates a shell formed of similar material and having outwardly and inwardly extending flanges 42 and 44 formed respectively at its large and small ends. The shell 40 is formed sufficiently smaller in diameter than the shell 34 that it may be inserted inside the latter, as illustrated in Fig. 2.

As shown in Fig. 2, the shell 34 is formed or placed in a cavity in a mold part 46, the shape of the cavity conforming to the outside configuration of the shell 34, while the shell 40 is formed or placed in a cavity in another mold part 48, which cavity has a shape corresponding to the shape of the outside of the shell 40. Next a coil spring 50, the intermediate portion of which is of frustro-conical shape, is placed between the two shells. As shown, the end coil 52 at the large end of the spring is formed so that it extends in line with and outside of the next adjacent coil 54, while at the small end of the spring, the end coil 56 is formed so that it extends in line with and inside the next adjacent coil 58. It will be seen that the two coils 52 and 54 lie between the flanges 36 and 42 of the two shells, and that the coils 56 and 58 lie between the flanges 38 and 44 of the shells, so that as the parts 46 and 48 of the mold are moved toward each other, the end coils of the spring will be squeezed between these flanges. Suitable means (not shown) are provided to apply vulcanizing heat and pressure to the mold parts, and since the material of which the sleeves are formed is of the type which becomes plastic or moldable when so treated, the flanges 36 and 42 become bonded together with the coils 52 and 54 of the spring being embedded therein, and at the opposite end the flanges 38 and 44 become bonded together with the coils 56 and 58 being embedded therein, as will be well understood by those skilled in this art. The shape of the cavities in the mold parts is such that no pressure is applied to the intermediate portions of the shells which would tend to force them together, in order that they may not become bonded together.

The resulting article is shown in Fig. 3, wherein it will be seen that the intermediate portions of the shells 34 and 40 are separated from each other to form a closed chamber 60 which extends annularly around the sealing member. While the end coils 52 and 54 at one end of the spring, and the coils 56 and 58 at the opposite end are embedded within the bonded together portions of the two shells, it will be seen that the intermediate coils of the spring are disposed within the chamber 60, so that they are free to move toward or away from each other as the spring is compressed or allowed to expand, without their normal action being interfered with in any way by coming into contact with any part of the rest of the sealing element.

Referring again to Fig. 1, the sealing element just described is placed in the space between the disc 24 and the face 22 when the pump is assembled, the dimensions of the parts being such that the sealing element has to be compressed in an axial direction in order to get it into the space provided. When so compressed, the intermediate portions of the shells 34 and 40 being somewhat more resilient and flexible than the rest of the sealing element, become bowed outwardly as shown in Fig. 1. Since the natural tendency for the sealing element 26 is to expand to its uncompressed condition, it therefore bears tightly against the face 22 in the impeller, and against the disc 24, making a fluid tight seal at these points of contact because of the resiliency of the sealing element and the pressure with which it is forced against these surfaces. The tendency of the sealing element to expand axially also causes the disc 24 to be pressed firmly against the face 20 in the housing, and since the disc is rotating while the housing is stationary, the surface of the disc which is pressed against the face soon wears into a ground fit with the surface of the shoulder, thus making a fluid tight seal at this point. The function of the coil spring is to assist the tendency of the sealing element to expand in an axial direction, it being possible to obtain a greater pressure of the sealing element against the face 22 and the disc 24 when the spring is used than if the resiliency of the sealing element were relied upon alone.

It will be seen therefore that the fluid being circulated by the pump or other device with which our seal is used is positively prevented from escaping at the point where the shaft emerges from the pump housing, since every opening through which it might leak out is positively sealed. Since the coil spring is embedded within and completely encased by the material of which the sealing element is formed, it not only is protected from coming into contact with the fluid being circulated by the pump and therefore is protected from corrosion or other damage caused by elements in the fluid, but it is at all times retained in proper assembled relation with the casing of the sealing element without requiring the use of any retaining rings or other securing means, thereby not only reducing the cost of production because of the smaller number of parts involved but also eliminating the labor required in assembling the several parts ordinarily used in seals of this general type.

A further advantage of the form of sealing device described above is that since the central portion of the sealing element, which is the portion which flexes during use to permit the sealing element to be compressed or to expand, is formed of two thicknesses of material, i. e. the intermediate portions of the shells 34 and 40, a double protection against leakage caused by fracture or puncture of the sealing element is provided, since both of these thicknesses of material would have to become fractured or punctured before the fluid could escape through the sealing element.

In Fig. 4 a modification of the sealing device is shown. In this form of the invention, only one shell 62 of rubber or suitable resilient composition material is used, and the coils 52 and 54 at the large end of the spring 50 are molded into a flange 64 formed at the large end of the shell 62, and the coils 56 and 58 at the opposite end of the spring are molded into a flange 66 formed at the small diameter end of the shell 62. In this form of the invention, the advantages of the unitary device, reduction of the number of parts involved and simplification of assembly operations are present, but of course the spring is not protected as completely as in the form of sealing element shown in Fig. 3.

In Fig. 5, a still different form of the invention is shown, wherein the coil spring 50 is molded into a shell 70 of rubber or suitable resilient composition material at the time the latter is formed. In this form of sealing device, not only the end coils 52, 54 and 56, 58 are embedded with the material of which the sealing element is formed but the entire coil spring is so embedded in order that the spring will be completely protected from coming into contact with the fluid being circulated by the pump.

In all of the forms of sealing element shown and described, it will be noted that they are formed of frustro-conical shape, and that they are intended to be assembled in the pump structure in such manner that the small end of the sealing element bears against the anti-friction disc. The advantage of this arrangement is that since the pressure exerted against the disc by the sealing element and spring is applied as close as possible to the central portion of the disc, it is easier for the latter to vary its position to conform to the position of the face of the shoulder against which it bears than would be the case were the pressure applied at or adjacent to the edge of the disc.

While in the pump structure illustrated in the drawing, the sealing element is shown as being intended to bear firmly against the impeller and to rotate with the latter, it will be understood that the structure may be reversed, as is well understood in the art, in which case the sealing element would be forced firmly against the face in the housing and therefore would not rotate, and the sealing disc 32 would be keyed or otherwise secured to the housing to prevent rotation of the disc, the latter being forced by the expansion of the sealing element against the face provided in the impeller so that the relative rotary movement in such a structure would be between the disc and the impeller.

While we have shown and described specific embodiments of our invention, it will be understood of course that various changes in size, shape and relation of parts may be made without departing from the spirit and scope of the appended claims.

We claim:

1. In a fluid sealing device, the combination of an annular member formed of resilient material adapted to be compressed axially, and a compression spring having its ends embedded within the annular member, the central portion of the spring not being embedded within the annular member.

2. In a fluid sealing device, the combination of an annular member formed of resilient material adapted to be compressed axially, said member having an annularly extending chamber formed therein, and a coil spring, the end coils of which are embedded in the material of the annular member at each end thereof, and the intermediate coils of which are disposed within the chamber.

3. In a fluid sealing device, the combination of an annular member formed of two shells of moldable resilient material bonded together at their ends, the intermediate portions of the shells being spaced apart to form an annular chamber within the member, and an annular spring, the ends of which are embedded within the bonded together portions of the two shells, and the intermediate portion of which is disposed within the chamber.

4. In a fluid sealing device, the combination of an annular member formed of two shells of moldable resilient material bonded together at their ends, the intermediate portions of the shells being spaced apart to form a closed annular chamber within the member, and a compression spring disposed within said chamber.

LLOYD BLACKMORE.
HORACE D. SEELINGER.